April 8, 1969    J. W. WASELESKI, JR    3,437,107
APPARATUS FOR CONTROLLING THE LEVEL OF A LIQUID
Filed Nov. 19, 1965

Joseph W. Waseleski, Jr.,
Inventor.
Koenig, Senniger, Powers and Leavitt,
Attorneys.

United States Patent Office 3,437,107
Patented Apr. 8, 1969

3,437,107
APPARATUS FOR CONTROLLING THE LEVEL OF A LIQUID
Joseph W. Waseleski, Jr., Mansfield, Mass., assignor to Texas Instruments Incorporated, Dallas, Tex., a corporation of Delaware
Filed Nov. 19, 1965, Ser. No. 508,694
Int. Cl. F16k 21/18, 31/42; H01c 7/04
U.S. Cl. 137—392                                    7 Claims

ABSTRACT OF THE DISCLOSURE

A liquid level controller is disclosed which employs the cooling effect of the liquid being controlled as a means of detecting the presence of the liquid at a predetermined level. A single thermistor of coaxial construction mounted at the predetermined level is connected in series with the actuator of a liquid flow controlling valve across a voltage source. The thermistor comprises a semiconductor material having a negative temperature coefficient and has an equilibrium current-voltage characteristic which includes a positive resistance region at relatively low current levels and a negative resistance region at relatively high current levels. Accordingly, when the thermistor is cooled by the liquid, thermal equilibrium occurs at a level which is less than deenergization threshold of the valve actuator and when the probe is not cooled by the liquid equilibrium occurs at a current level which is greater than the energization level of the actuator. Thus the valve is actuated to maintain the liquid at the preselected level.

---

This invention relates to apparatus for controlling the level within a vessel of a liquid having substantial cooling capacity and more particularly to such apparatus employing a self-heating thermistor probe for sensing the presence of the liquid at a preselected level.

Among the several objects of the invention may be noted the provision of apparatus for controlling the level of a liquid in which a liquid level sensor operates a valve directly without auxiliary power amplification; the provision of such apparatus wherein the liquid level sensor will directly operate a valve requiring a relatively high electric current level for actuation and a lower current level for deactuation; the provision of such apparatus which will maintain the level of a liquid at a preselected level very precisely; the provision of such apparatus which responds quickly to changes in liquid level; the provision of such apparatus employing a liquid level sensor which is relatively unaffected by the character of the liquid whose level is being controlled; the provision of such apparatus employing a sensor which is capable of directly controlling substantial amounts of electric power; and the provision of such apparatus which is reliable and which is relatively simple and inexpensive. Other objects and features will be in part apparent and in part pointed out hereinafter.

Briefly, apparatus according to the present invention will control the level within a vessel of a liquid having substantial cooling capacity. The apparatus includes an elongate thermistor probe having a conductive outer casing, a conductive central core coaxial with the casing and a filling of a semiconductor material having a negative temperature coefficient of resistivity between the casing and the core. The probe is adapted to be contacted by the liquid when it reaches a preselected level. The apparatus also includes valve means for affecting the level of the liquid in the vessel. The valve means is operated by an electrical actuator having a predetermined load impedance, the actuator having also an energization current threshold above which the valve is actuated and a deenergization current threshold below which the valve is deactuated. The probe and the actuator are serially connected to an electric power source providing a predetermined voltage for heating the probe, the probe having a thermal-electrical dissipation characteristic relative to the predetermined voltage and the actuator load impedance such that equilibrium current when the probe is cooled by the liquid is less than the deenergization threshold and equilibrium current when the probe is not cooled by the liquid is greater than the energization threshold whereby the valve means is directly actuated by the probe when the liquid level within the vessel is below the preselected level and is deactuated when the liquid level contacts the probe.

The invention accordingly comprises the apparatus hereinafter described, the scope of the invention being indicated in the following claims.

In the accompanying drawings, in which one of various possible embodiments of the invention is illustrated:

Corresponding reference characters indicate corresponding parts throughout the several views of the drawings.

Figure 1:
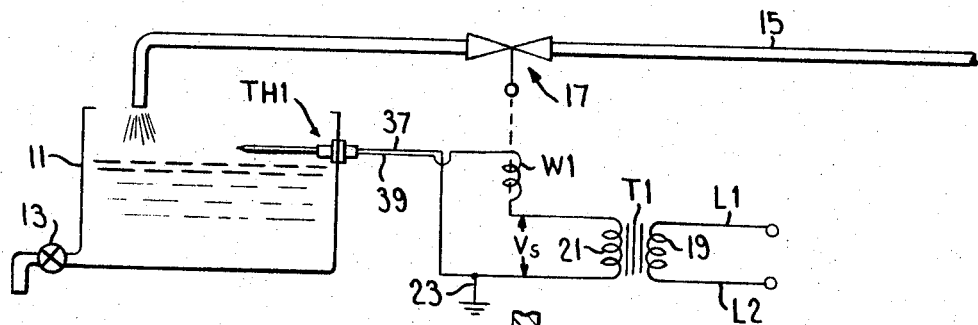
FIG. 1 is a diagrammatic illustration of apparatus according to the present invention for controlling the level of liquid within a vessel.

Referring now to FIG. 1, there is indicated at 11 a vessel or tank for containing a liquid. Liquid may be drawn off from tank 11 by means of a valve 13. Liquid for replenishing the level within tank 11 is provided through a line 15 from a suitable supply (not shown). The flow of liquid into tank 11 is controlled by a conventional solenoid valve as indicated at 17. Valve 17 includes an electrical actuator including a winding W1 for opening the valve to admit liquid into tank 11. Winding W1 opens valve 17 when the current passing through the winding exceeds a predetermined energization current threshold $I_E$ and closes the valve when the current drops below a predetermined deenergization threshold $I_D$.

An elongate thermistor probe TH1 is mounted on a side wall of tank 11 extending horizontally for contact with the liquid at the preselected level at which it is desired to maintain the level of liquid within the tank. A.C. electric power for energizing actuator winding W1 and for heating thermistor probe TH1 is obtained through a pair of supply leads L1 and L2 from a suitable source or conventional supply mains (not shown). The primary winding 19 of a transformer T1 is connected across lines L1 and L2. Transformer T1 includes a secondary winding 21 which provides alternating current at a reduced voltage $V_S$ to the liquid level control apparatus. Valve actuating winding W1 and thermistor TH1 are connected in series across winding 21, one side of winding 21 being grounded as at 23.

Figure 2:
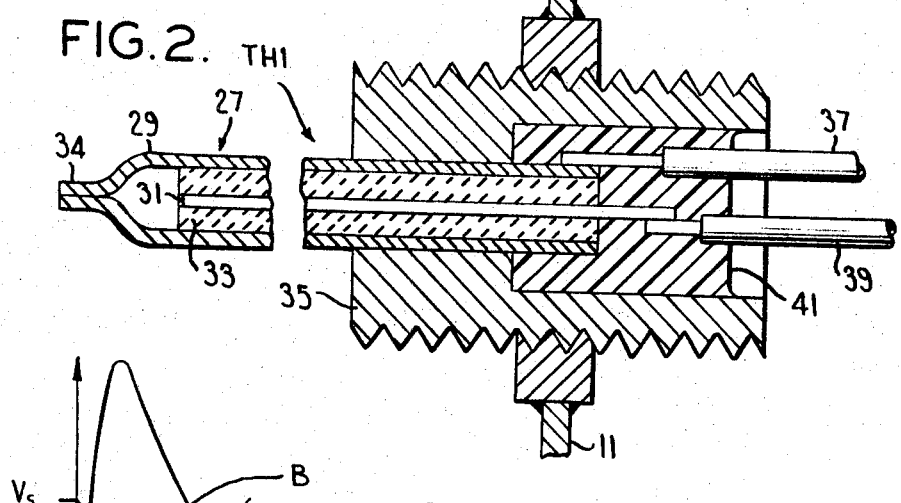
FIG. 2 is a side view in section of a coaxial thermistor liquid level probe employed in the apparatus of FIG. 1.

Thermistor probe TH1 is shown in greater detail in FIG. 2. The sensing portion of probe TH1 includes an elongate thermistor sensing element 27 which is of coaxial construction. Element 27 includes a metallic outer tubular casing 29 and a metallic central core 31 which is coaxial with casing 29. The space between casing 29 and core 31 is filled with a semiconductor material 33 having a negative temperature coefficient or resistivity. A preferred form of thermistor element 27 and the method of making such an element are disclosed in copending, coassigned application Ser. No. 331,712, filed Dec. 19, 1963, now Patent No. 3,266,001, by Harry M. Landis and myself and entitled Temperature Sensors and Their Manufacture. As disclosed in that application, a coaxial NTC thermistor element is constructed by filling the space between a tubular casing and a coaxial core with an inorganic semiconductor material in particulate form and then swaging the resultant structure in conventional rotary swaging apparatus to substantially reduce its diameter and to compact the semiconductor material until its conductivity attains a value which is not less than approximately 50% of its theoretical conductivity.

Element 27 is supported by a bushing 35 which permits it to be conveniently mounted on the side wall of tank 11. One end of coaxial element 27 is sealed by being crimped and welded as indicated at 34. Suitable insulated leads 37 and 39 are welded to casing 29 and core 31 respectively and the open end of element 27 is sealed by being potted with a suitable encapsulant as indicated at 41. Lead 37 is preferably connected directly to the grounded side of secondary winding 21 so that casing 29 is also held at ground potential. Thus the electrical operation of the liquid level control apparatus is not affected by contact of element 27 with the liquid within tank 11.

As is understood by those skilled in the art, thermistors having a negative temperature coefficient of resistivity have an equilibrium current-voltage characteristic which is peaked and which includes a positive resistance region at relativly low current levels and a negative resistance region at relatively high current levels. The negative resistance portion of the characteristic is caused by the increased power dissipation which results from the reduction in resistance which occurs at higher temperatures. Accordingly, if the current provided to an NTC thermistor is not limited by external circuit resistance, a run-away thermal situation can develop which may lead to the destruction of the thermistor.

The particular current-voltage characteristics of a given thermistor element depend not only upon the type of semiconductor material used but also upon the heat dissipating capacity of the thermistor configuration. The elongate coaxial thermistor construction shown in FIGS. 1 and 2 has an inherently high heat dissipating capacity due to its high ratio of surface area to mass. Because of this high ratio of surface to mass, the heat dissipating capacity of thermistor element 27 is also highly dependent upon the character of the surrounding environment or media to which heat can be transmitted, e.g., its specific heat capacity and thermal conductivity. In particular, the heat dissipating capacity and hence the current-voltage characteristic change markedly when the thermistor passes from an air or gaseous environment into a liquid environment. For example, in FIG. 3 the current-voltage characteristics of element 27 when it is in air at 70° F. is represented by the curve indicated at A. The current-voltage characteristic of element 27 when it is immersed in water at 70° F. is represented by the curve indicated at B. It should be understood that these curves represent thermal equilibrium conditions for each point on the curves. An example of a thermistor material (NTC or negative temperature coefficient) for use with liquids having a temperature range between 0° C. and 100° C. would be a $NiOMnO_2$ mixture. It will be understood that the selection of thermistor material will depend upon the temperature of the liquid whose level is to be controlled and the power level necessary to actuate valve 17.

At a given temperature, the element 27 will dissipate more power when it is immersed in water than when it is in air. Therefore, curve B lies above the curve A. In this regard, it may be useful to note that the resistance of element 27 at a given point on either of the curves A and B is the slope of a line extending from the origin of the graph to that point.

Figure 3:
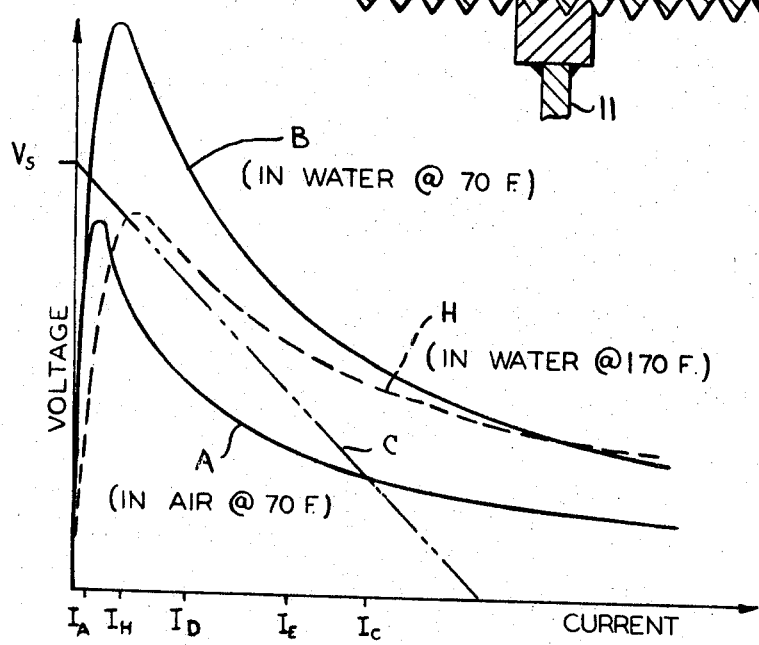
FIG. 3 is a graph representing the equilibrium current-voltage characteristics of the probe of FIG. 2, when it is cooled by a liquid and when it is not so cooled, in relation to a predetermined load impedance.

The graph of FIG. 3 includes also a load line C, the slope of which represents the impedance of the valve actuating winding W1. Load line C intersects the voltage or ordinate of the graph of FIG. 3 at a point corresponding to the voltage $V_S$ provided to the system by secondary winding 21 of the transformer T1. The values of voltage $V_S$, the impedance of winding W1 and the characteristics of thermistor element 27 are chosen in relation to each other such that load line C intersects the positive resistance region of curve B thereby providing a quite low current level $I_A$ when the probe is cooled by the liquid and such that the curve C intersects the curve A in the positive resistance region thereby providing a relatively high level of equilibrium current $I_C$ when the probe is not cooled by the liquid.

Equilibrium current $I_A$ is well below the deenergization current threshold $I_D$ while equilibrium current $I_C$ is above the above the energization current threshold $I_E$. Accordingly, when the level of liquid falls below probe TH1, the probe heats itself until it reaches the equilibrium current $I_C$ defined by the intersection of curves C and A. The valve 17 is thus actuated by winding W1 and liquid is admitted into tank 11. When the liquid level contacts probe TH1, the thermistor element 27 is cooled and the equilibrium current falls to the level $I_A$ defined by the intersection of curve C and curve B. Valve 17 is thus deactuated and the flow of liquid into the tank is cut off. It should be noted that by employing the opposite resistance regions of the NTC thermistor characteristics, it is possible to obtain equilibrium currents which are widely different for the immersed and nonimmersed conditions of probe TH1. Thus valve 17 may be satisfactorily operated directly by probe TH1 to maintain the liquid level within tank 11 at a preselected level even though there is a substantial differential between the energization current threshold $I_E$ of winding W1 and its deenergization current threshold $I_D$.

If the liquid within tank 11 is hot, the heat dissipating capacity of probe TH1 will not be as great when immersed as it would if the water were cool but, because of the large spread of equilibrium currents obtainable according to the present invention, the level of hot liquids may also be satisfactorily controlled. The graph of FIG. 3 also includes a curve H which represents the current-voltage equilibrium characteristic of thermistor element 27 when it is immersed in water at 170° F. As may be seen, the peak of curve H is lower and is shifted to the right relative to the curve B. Curve C, however, still intersects this curve H at an equilibrium current level $I_H$ which is well below the deenergization current threshold $I_D$.

It should be noted that the use of a coaxial thermistor element 27 of coaxial construction is highly advantageous in obtaining direct operation of a valve actuator without need for power amplification since its high ratio of surface area to mass causes it to have a relatively high thermal dissipation capacity and permits it to respond quickly as the liquid level rises above or falls below the preselected probe level. The coaxial construction is advantageous also in that the thermistor construction is inherently shielded and protected from the liquid which contacts it by the outer casing 29 which may be electrically grounded.

While a valve means which selectively admits liquid into tank 11 has been shown, it will be understood that a valve means which is operated to release liquid from the tank may also be used to affect that liquid level in providing level control apparatus according to the present invention.

In view of the above, it will be seen that the several objects of the invention are achieved and other advantageous results attained.

As various changes could be made in the above apparatus without departing from the scope of the invention, it is intended that all matter contained in the above description or shown in the accompanying drawings shall be interpreted as illustrative and not in a limiting sense.

What is claimed is:

1. Apparatus for controlling the level within a vessel of a liquid having substantial cooling capacity, said apparatus comprising:
- an elongate thermistor probe including a conductive outer casing, a conductive central core coaxial with said casing and a filling of a semiconductor material having a negative temperature coefficient of resistivity between said casing and said core, said probe being adapted to be contacted by said liquid when it reaches a preselected level;
- valve means for affecting the level of said liquid in said vessel, said valve means including an electrical actuator having a predetermined load impedance, said actuator having an energization threshold value of current above which said valve is actuated and a deenergization threshold value of current below which said valve is deactuated; and
- circuit means for serially connecting said probe and actuator across an electric power source providing a predetermined voltage for heating said probe and energizing said actuator, said probe having thermal and electrical dissipation characteristics relative to said voltage and said load impedance such that the current at thermal equilibrium when said probe is cooled by said liquid is in a positive resistance region and is less than said deenergization threshold value of current and the current at thermal equilibrium when said probe is not cooled by said liquid is in a negative resistance region and is greater than said energization threshold value of current, whereby said valve means is directly actuated by current from said probe when the liquid level within the vessel is below said preselected level and is deactuated when the liquid contacts said probe.

2. Apparatus as set forth in claim 1 wherein said material comprises a mixture of nickel oxide and manganese dioxide compacted to effect a conductivity therein which is not less than approximately 50% of the theoretical conductivity.

3. Apparatus as set forth in claim 2 wherein said probe is of swaged coaxial construction, the compaction of said mixture being effected by the swaging.

4. Apparatus as set forth in claim 1 wherein said circuit means includes an isolating transformer including a secondary winding, said probe and actuator being serially connected across said secondary winding.

5. Apparatus as set forth in claim 4 wherein said casing is connected to one side of said winding and said one side is grounded.

6. Apparatus as set forth in claim 1 wherein energization of said actuator opens a valve for admitting liquid into said vessel.

7. Apparatus for controlling the level within a vessel of a liquid having substantial cooling capacity, said apparatus comprising:
- an elongate thermistor probe including a conductive outer casing, a conductive central core coaxial with said casing and a filling of a semiconductor material having a negative temperature coefficient of resistivity between said casing and said core, said probe having thermal equilibrium current-voltage characteristics which include a positive resistance region at relatively low current levels and a negative resistance region at relatively high current levels, said current-voltage characteristic being a function of the heat-dissipating capacity of said probe, the heat-dissipating capacity being increased by contact with said liquid;
- valve means for controlling the flow of said liquid into said vessel, said valve means including an electrical actuator having a predetermined load impedance, said actuator having an energization threshold value of current above which said valve is opened and a deenergization threshold value of current below which said valve is closed; and
- circuit means for serially connecting said probe and actuator to an electric power source providing a predetermined voltage for heating said probe, the values of said load impedance and said voltage being related to the current-voltage characteristics of said probe so that, when said probe is cooled by said liquid, thermal equilibrium occurs in the positive resistance region of the characteristic with the current through said actuator being below said deenergization threshold value and so that, when said probe is not cooled by said liquid, thermal equilibrium occurs in the negative resistance region of the sensor's characteristic with the current through said actuator being above said energization threshold value whereby said valve is directly actuated by said probe to admit liquid into said vessel when the liquid level within the vessel is below said probe and is closed when the liquid level contacts said probe.

References Cited

UNITED STATES PATENTS

| 2,413,021 | 12/1946 | Wolfson et al. | 338—22 X |
| 2,483,450 | 10/1949 | Wolfner | 137—392 |
| 3,266,001 | 8/1966 | Landis et al. | 338—22 |
| 3,328,677 | 6/1967 | Naegele | 137—392 X |

WILLIAM F. O'DEA, Primary Examiner.

DAVID R. MATTHEWS, Assistant Examiner.

U.S. Cl. X.R.

317—132; 338—22